(12) United States Patent
Thum

(10) Patent No.: US 11,733,056 B2
(45) Date of Patent: Aug. 22, 2023

(54) DECENTRALIZED LMV CHARGING INFRASTRUCTURE

(71) Applicants: VOLKSWAGEN AG, Wolfsburg (DE); AUDI AG, Ingolstadt (DE); PORSCHE AG, Stuttgart (DE)

(72) Inventor: Maximilian Konstantin Thum, Foster City, CA (US)

(73) Assignees: Volkswagen Aktiengesellschaft; Audi AG; Porsche AG

( * ) Notice: Subject to any disclaimer, the term of this patent is extended or adjusted under 35 U.S.C. 154(b) by 655 days.

(21) Appl. No.: 16/521,759

(22) Filed: Jul. 25, 2019

(65) Prior Publication Data
US 2021/0025728 A1    Jan. 28, 2021

(51) Int. Cl.
| | | |
|---|---|---|
| *H02J 7/00* | (2006.01) | |
| *H02J 7/14* | (2006.01) | |
| *G01C 21/36* | (2006.01) | |
| *B60L 58/12* | (2019.01) | |

(52) U.S. Cl.
CPC .......... *G01C 21/3644* (2013.01); *B60L 58/12* (2019.02); *G01C 21/3664* (2013.01); *G01C 21/3676* (2013.01); *G01C 21/3697* (2013.01); *B60L 2240/62* (2013.01)

(58) Field of Classification Search
CPC . B60L 58/12; B60L 2240/62; G01C 21/3644; G01C 21/3676; G01C 21/3697
USPC .................................................. 320/134, 109
See application file for complete search history.

(56) References Cited

U.S. PATENT DOCUMENTS

| | | | | |
|---|---|---|---|---|
| 9,566,868 | B2* | 2/2017 | Jammer | G07F 15/003 |
| 2012/0323389 | A1* | 12/2012 | Shelton | H02J 3/00 |
| | | | | 700/295 |
| 2013/0211988 | A1* | 8/2013 | Dorn | G08G 1/20 |
| | | | | 700/297 |
| 2014/0081490 | A1* | 3/2014 | Adelman | B60L 53/16 |
| | | | | 320/109 |
| 2015/0094888 | A1* | 4/2015 | Hyde | B60L 53/65 |
| | | | | 701/22 |
| 2015/0191093 | A1* | 7/2015 | Yamamaru | B60L 53/16 |
| | | | | 320/109 |
| 2016/0023586 | A1* | 1/2016 | Potticary | B60R 9/10 |
| | | | | 414/462 |

(Continued)

FOREIGN PATENT DOCUMENTS

| | | |
|---|---|---|
| CN | 108116242 A | 6/2018 |
| GB | 2555692 A | 5/2018 |

(Continued)

OTHER PUBLICATIONS

Search Report for European Patent Application No. 20187590.3; dated Jan. 14, 2021.

(Continued)

*Primary Examiner* — Alexis B Pacheco
(74) *Attorney, Agent, or Firm* — Barnes & Thornburg, LLP

(57) ABSTRACT

Systems, devices and methods are provided for decentralized charging of LMVs. At the conclusion of an active riding session, an available decentralized charging vehicle is displayed to a scooter with low battery charge, and access is provided to a charging interface of the decentralized charging vehicle so that the LMV may be coupled to the charging interface.

16 Claims, 7 Drawing Sheets

(56) References Cited

U.S. PATENT DOCUMENTS

| | | | |
|---|---|---|---|
| 2016/0031517 A1* | 2/2016 | Neugebauer | E05B 71/00 |
| | | | 180/207.3 |
| 2016/0097650 A1 | 4/2016 | Aich et al. | |
| 2017/0230831 A1 | 8/2017 | Ganis et al. | |
| 2018/0060776 A1 | 3/2018 | Ahmed et al. | |
| 2018/0082585 A1* | 3/2018 | Zhang | G08G 1/096883 |
| 2018/0304759 A1 | 10/2018 | Chase et al. | |
| 2018/0307226 A1* | 10/2018 | Chase | G05D 1/0297 |
| 2019/0058982 A1* | 2/2019 | Lee | B62K 19/40 |
| 2020/0001736 A1* | 1/2020 | Imai | B60L 50/60 |
| 2020/0175551 A1* | 6/2020 | Penilla | B60L 53/80 |
| 2020/0262305 A1* | 8/2020 | Chakraborty | B60L 53/66 |
| 2020/0294078 A1* | 9/2020 | Hu | B60L 53/62 |
| 2020/0353831 A1* | 11/2020 | Corey | B60L 53/35 |
| 2021/0031804 A1* | 2/2021 | Oyama | G01C 21/3407 |
| 2021/0284043 A1* | 9/2021 | Wang | B60L 53/62 |
| 2021/0291687 A1* | 9/2021 | Ferguson | B60L 58/12 |
| 2021/0296939 A1* | 9/2021 | Lu | B60L 53/66 |
| 2021/0323420 A1* | 10/2021 | Lu | H02J 50/90 |
| 2021/0347275 A1* | 11/2021 | Chakraborty | B60L 53/80 |
| 2021/0347276 A1* | 11/2021 | Lu | B60L 53/665 |
| 2021/0394639 A1* | 12/2021 | Lu | B60L 58/13 |
| 2022/0024346 A1* | 1/2022 | Quattrini, Jr. | H02J 7/0027 |

FOREIGN PATENT DOCUMENTS

| | | |
|---|---|---|
| WO | 2017217929 A1 | 12/2017 |
| WO | 2018096001 A1 | 5/2018 |

OTHER PUBLICATIONS

Office Action; Chinese Patent Application No. 202010722061.4; dated Sep. 27, 2022.

* cited by examiner

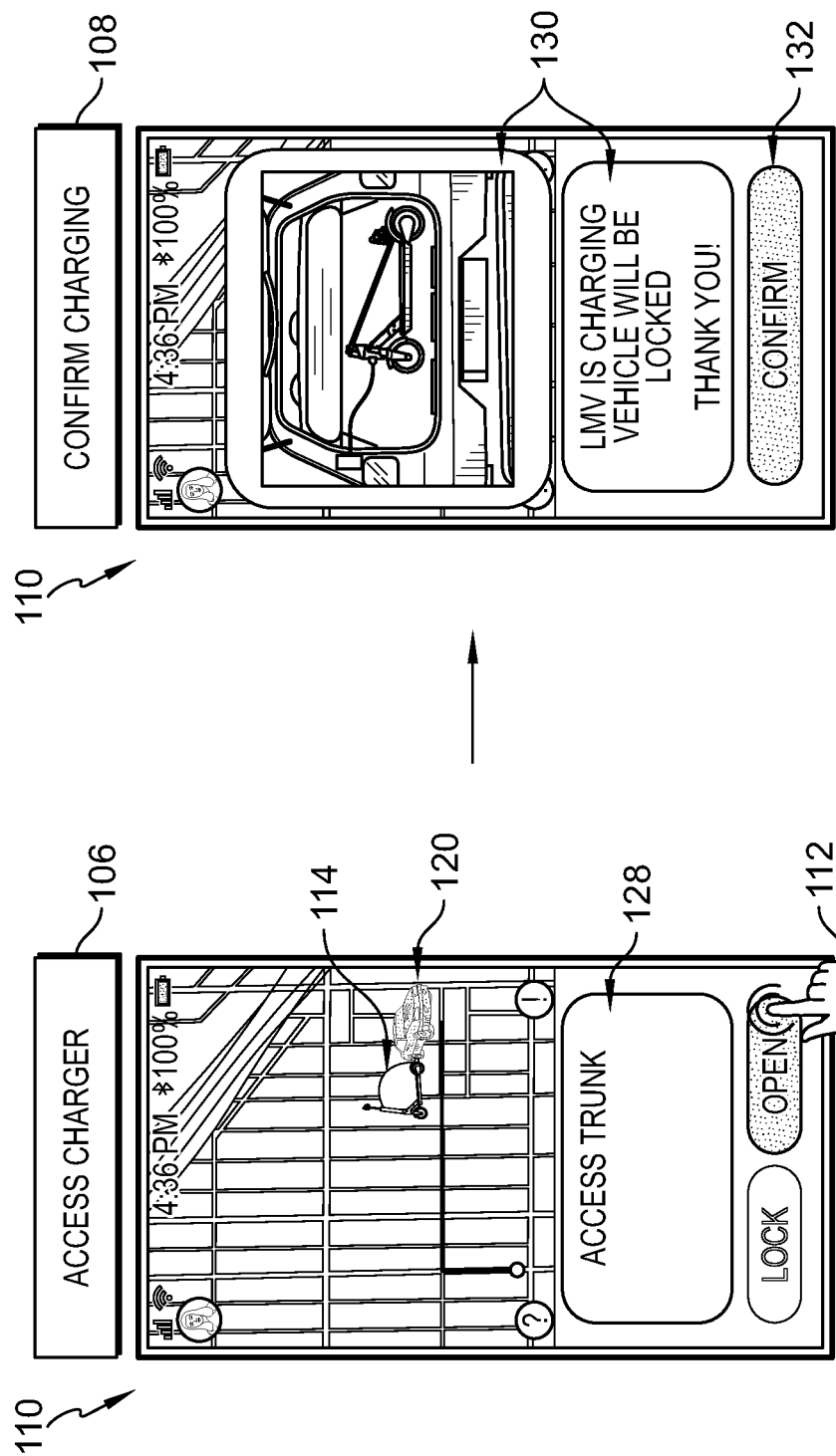

DECENTRALIZED LMV CHARGING INFRASTRUCTURE

BACKGROUND

The present disclosure related to systems, components and methodologies for a decentralized charging infrastructure. In particular, the present disclosure related to systems, components, and methodologies for charging localized use vehicles, or last mile vehicles (LMVs), using a dynamically positioned charging infrastructure.

SUMMARY

Disclosed embodiments provide a system for charging localized use vehicles, or LMVs, which may include a mobile device having a display configured to display the locations of one or more localized use vehicle and one or more decentralized charging vehicles and one or more decentralized charging vehicles configured to communicate charging availability to the mobile device and permit access to the system. The system may include means, located on the mobile device, for evaluating the charge state of a localized use vehicle, displaying a decentralized charging vehicle that has charging availability, and providing access to a charging interface of the decentralized charging vehicle so that the localized use vehicle is coupled to the charging interface.

In some embodiments, the means may be an application on the mobile device configured to activate a localized use vehicle session, track the geographical location of the localized use vehicle used in the activated session, and unlock the trunk or a charging cap to provide access to the charging interface.

In disclosed embodiments, a device for decentralized charging of localized use vehicle may comprise a mobile device with an application. The application configured to: evaluate the charge state of a localized use vehicle in an active session, display a decentralized charging vehicle that has charging availability, and provide access to a charging interface of the decentralized charging vehicle to couple the localized use vehicle to the charging interface.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIGS. 1A-D depict a diagrammatic view of an exemplary process of a LMV in the field that is in need of charging and accessing a charger in a fleet vehicle in order to charge the LMV in the field;

FIG. 1C depicts an exemplary trunk access to the charger for charging the LMV;

FIG. 1D shows a confirmation that the LMV is charging in the trunk of the vehicle;

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

FIGS. 1A-1D constitute a diagrammatic view of an exemplary system for charging a vehicle for localized use, in particular a scooter. The scooter may be part of a fleet of scooters that may be activated or deactivated via an application. The application may be accessible via a mobile device such as a mobile phone and visible via a display of the mobile device.

Figure 1B:
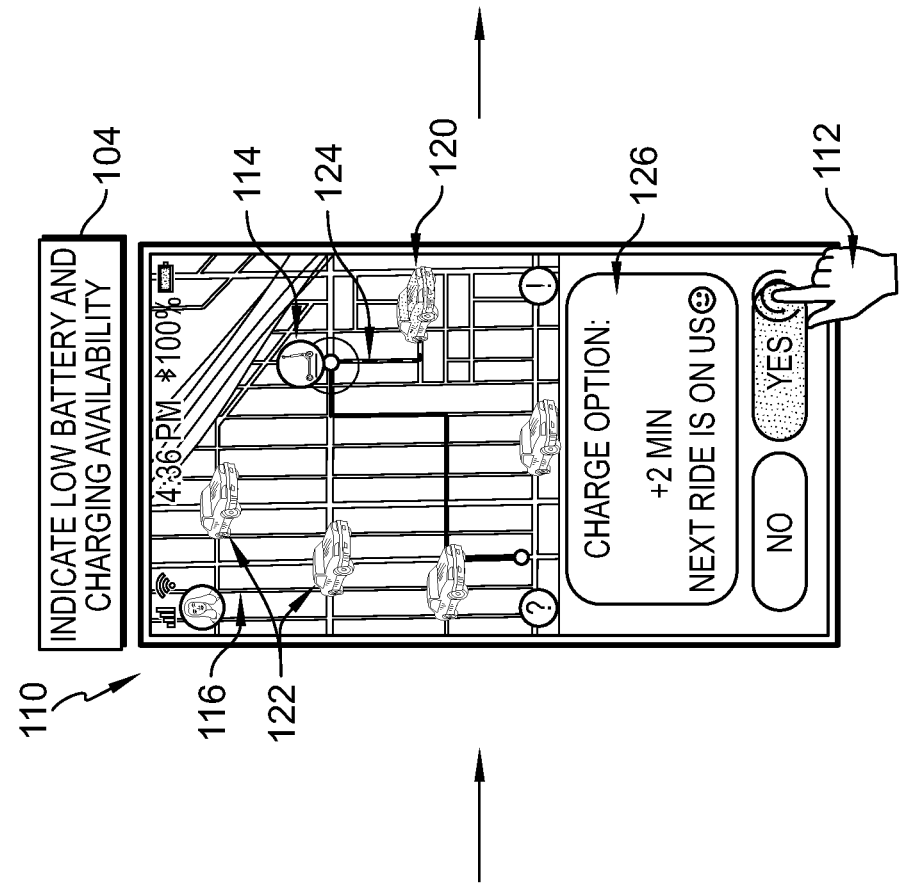
FIG. 1B illustrates how the application determines that the battery is low in the LMV and offers a charging option in a nearby parked vehicle.
Figure 1A:
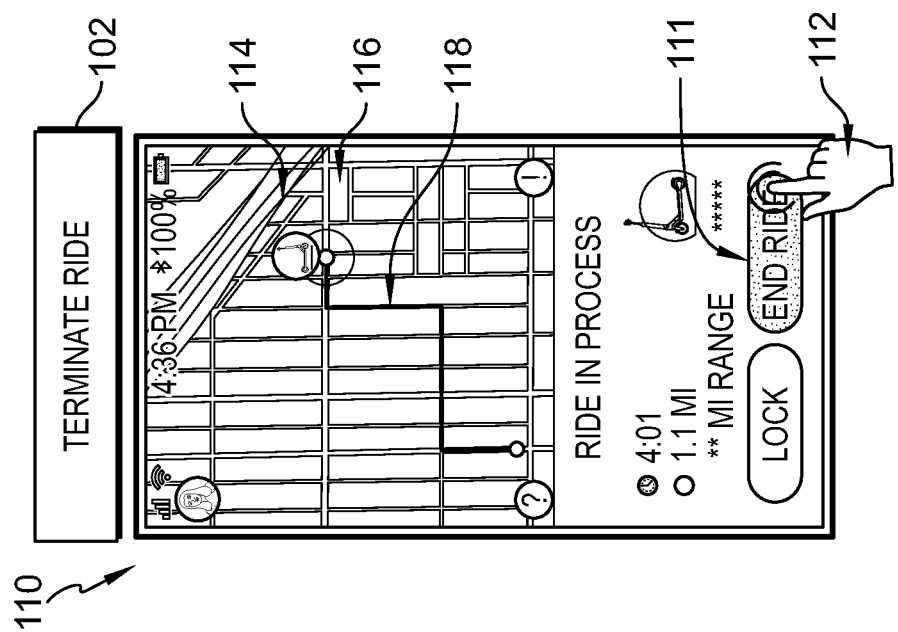
FIG. 1A shows an LMV completing a trip in which the operator is ending the ride in an application.

As seen in FIG. 1A, an active riding session is coming to a conclusion. An application 110 in which the active session displays an LMV 114 at location at the point the user wishes to terminate the ride 102. The display includes a map 116, geolocation information about the LMV 114, 118, and one or more selectable buttons 111 that a user 112 may select to end the ride.

FIG. 1B illustrates how the application 110 has updated in response to a selection to end the ride via one of the selectable buttons 111, by the user 112 in FIG. 1A. The application 110 may determine and indicate a low battery and the availability of charging 104. Application 110 may display map 116 with the location of the LMV 114, locations of vehicles being able to charge the LMV, or charging vehicles 122, and the closest charging vehicle 120 to the LMV. Route guidance 124, such as a dashed line, may be provided between the position of the LMV and the position of the closest charging vehicle on the map 116. Additionally, a text box 126 may appear communicating the option for charging, the estimated additional transit time to the charging vehicle, and any incentives for traveling to the charging vehicle. The user 112 may indicate they wish to travel to the charging vehicle.

FIG. 1C illustrates how to access the charger 106 in the charging vehicle 120. When the LMV 114 reaches the charging vehicle 120, a one-time charger access, such as a trunk unlock message 128, may be communicated to the user 112 and the user may access the trunk by selecting an open button. Additional instructions may be included in message window 128, such as how to load LMV into the trunk or how to couple the LMV to charging infrastructure. In FIG. 1D, illustrating confirmation of charging 108, the application 110 updates with a message 130 to indicate the LMV has been successfully coupled to the charger and that the charging vehicle will be locked upon confirming 132.

Figure 2A:
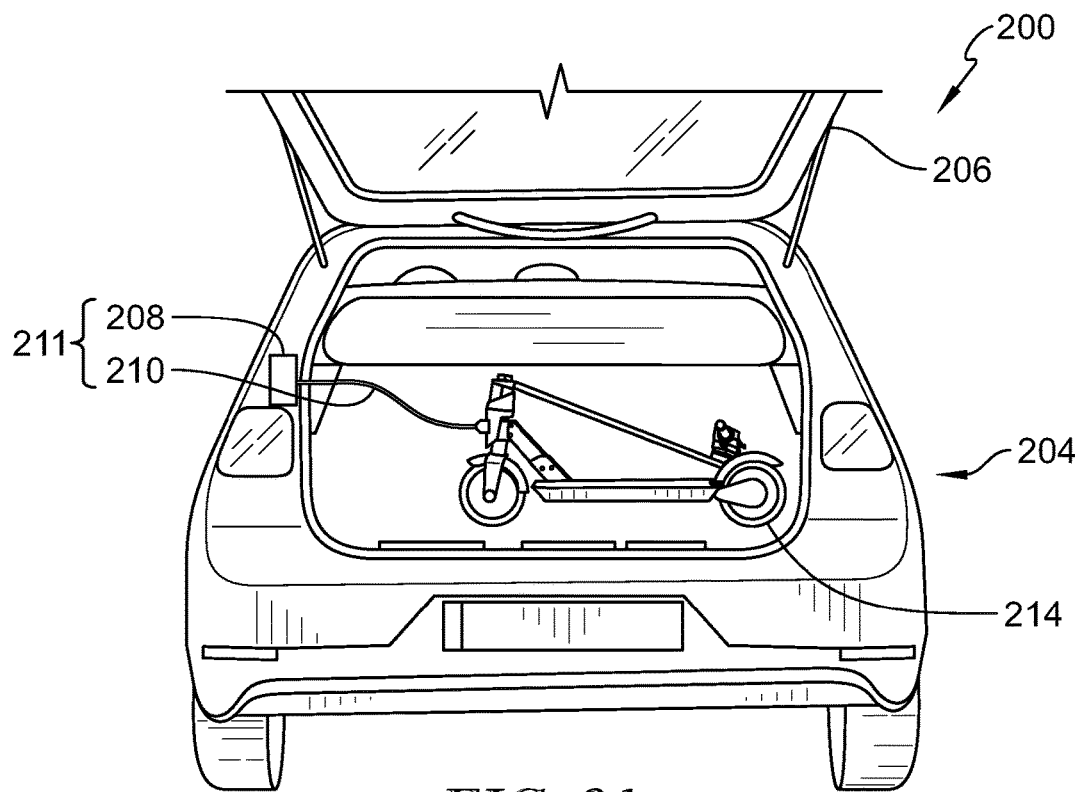
FIG. 2A is an exemplary embodiment of a trunk access to charging interface where the LMV is secured in the trunk of the vehicle and the trunk may be closed and locked.
Figure 2B:
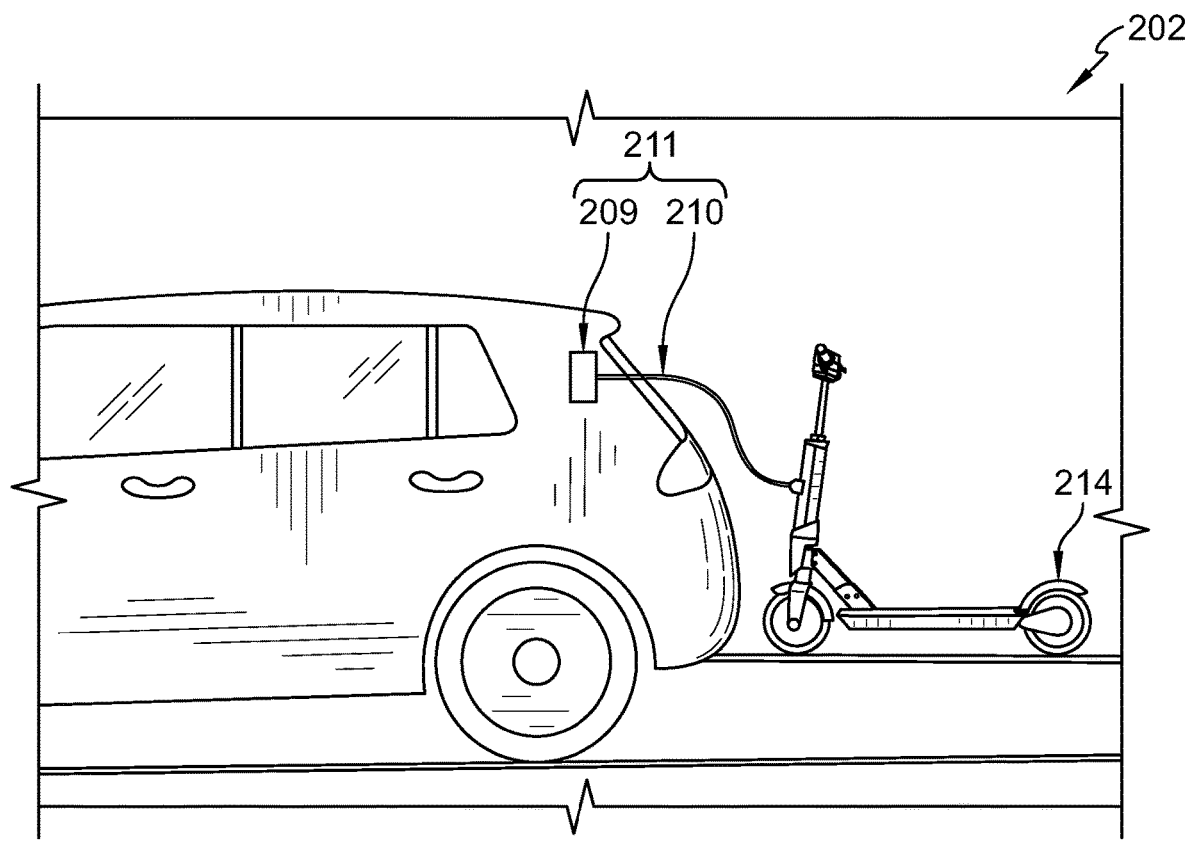
FIG. 2B is an exemplary embodiment of an exterior access to charging interface in which the LMV may be left on the sidewalk or otherwise adjacent to the exterior to the vehicle.

FIGS. 2A-2B illustrate two different types of charging infrastructure. FIG. 2A illustrates a charging vehicle 200 having trunk-accessible charging infrastructure 211. The trunk-accessible charging infrastructure includes an outlet, for example a 12-volt or 48-volt battery, and corresponding outlet 208 and a charging cable or other coupling device 210 for wired or wireless charging of the LMV 214. LMV 214 may be secured in the trunk 204 with one or more mountings or securing mechanisms to prevent the LMV 214 from moving while the charging vehicle 200 is in motion. Tailgate 206 may be closed once the LMV 214 is coupled to the charging infrastructure 211 so that the LMV does not take up additional space in the environment. FIG. 2B illustrates a charging vehicle 202 in which charging infrastructure 211 may be accessible to LMV 214 outside the vehicle while the vehicle cabin or trunk access remains locked. For example, charging infrastructure 211 may comprise the charging vehicle's high voltage battery 209 and a power coupler or cable 210. The power coupler 210 may be accessible via a lockable panel covering the cable, on the exterior of the charging vehicle 202. Power coupler 210 couples the LMV 214 to the high voltage battery 209 so that the LMV may charge while remaining accessible on a street, curb, sidewalk, or other surface adjacent to and exterior to the charging vehicle 202.

In a method for decentralized charging of an LMV 300, an LMV active ride session has been started and has been indicated to be complete 302. For example, the LMV may be any of a scooter, a bicycle, a battery for a scooter or bicycle, or an electronic vehicle belonging to a fleet of decentralized vehicles. A battery of the LMV is determined to be low at 304. A low battery may be a battery whose charge is below a predefined threshold. For example, a low battery may be a battery below 50% or below 25%. Next it is determined if there is a vehicle nearby that has available charging 306. Charging vehicles may be, for example, a fleet of rentable vehicles such as a carshare fleet that is decentralized and parked wherever the last user parks it. Charging vehicles may also or alternatively include private vehicles. A predefined radius relative to the LMV may be searched. For example, a 5-block radius may be searched. Alternatively, the search radius may be adjusted and may be the size of a map that is viewable in the user mobile device window. If there is no vehicle nearby with available charging, then the LMV is simply locked and left at the termination point of the activate ride session 308.

If there is a charging vehicle nearby, it is further determined if the user selects to charge the LMV 310. For example, the user may select a particular vehicle closer to their final destination on foot or may simply approve a highlighted closest vehicle to the LMV. If the user does select the charging option, then the LMV is simply locked in place 312 for the next user. If the charging option is selected then route guidance may be displayed to the user from the LMV to the charging vehicle 314. An indicator of the vehicle with available charging may be provided visually and/or audibly as the LMV operator approaches the charging vehicle 316. For example, the charging vehicle lights may flash and/or the horn may sound when the user of the LMV is on the same block as the charging vehicle to assist the user in identifying the appropriate vehicle. This proximity can be based on either a vehicle detection of the LMV or of a mobile device of the user. Once the LMV has arrived at the vehicle, access may be provided to charging infrastructure of the charging vehicle 318. For example, if the charging infrastructure is within the trunk, the user may receive a one-time access via a mobile device to unlock and open the tailgate.

An example of mobile access is provided in US 20170325095, incorporated by reference.

Furthermore, if the charging infrastructure is accessible at the exterior of the vehicle, a one-time access via the mobile device may similarly be provided to unlock and open a panel covering the infrastructure. In some embodiments, the LMV itself, when in proximity to the charging vehicle may function as an access device to that specific charging vehicle. In this embodiment, the trunk would automatically open as the LMV approaches the charging vehicle. Accordingly, the user may then couple the LMV to the charging equipment at 320. This may involve folding the LMV, or otherwise loading the LMV into the trunk of the vehicle and securing it from movement. Then the LMV is coupled to the charging infrastructure via a wired cable or wireless charging. A charging indicator may register on the user's mobile device to ensure successful coupling. Then the user may close the trunk and it may securely locked. In examples where the LMV is simply the battery, the battery may be removed from a bicycle or scooter, placed in the trunk to charge and replaced with an available battery already charged in the vehicle trunk.

Figure 3:
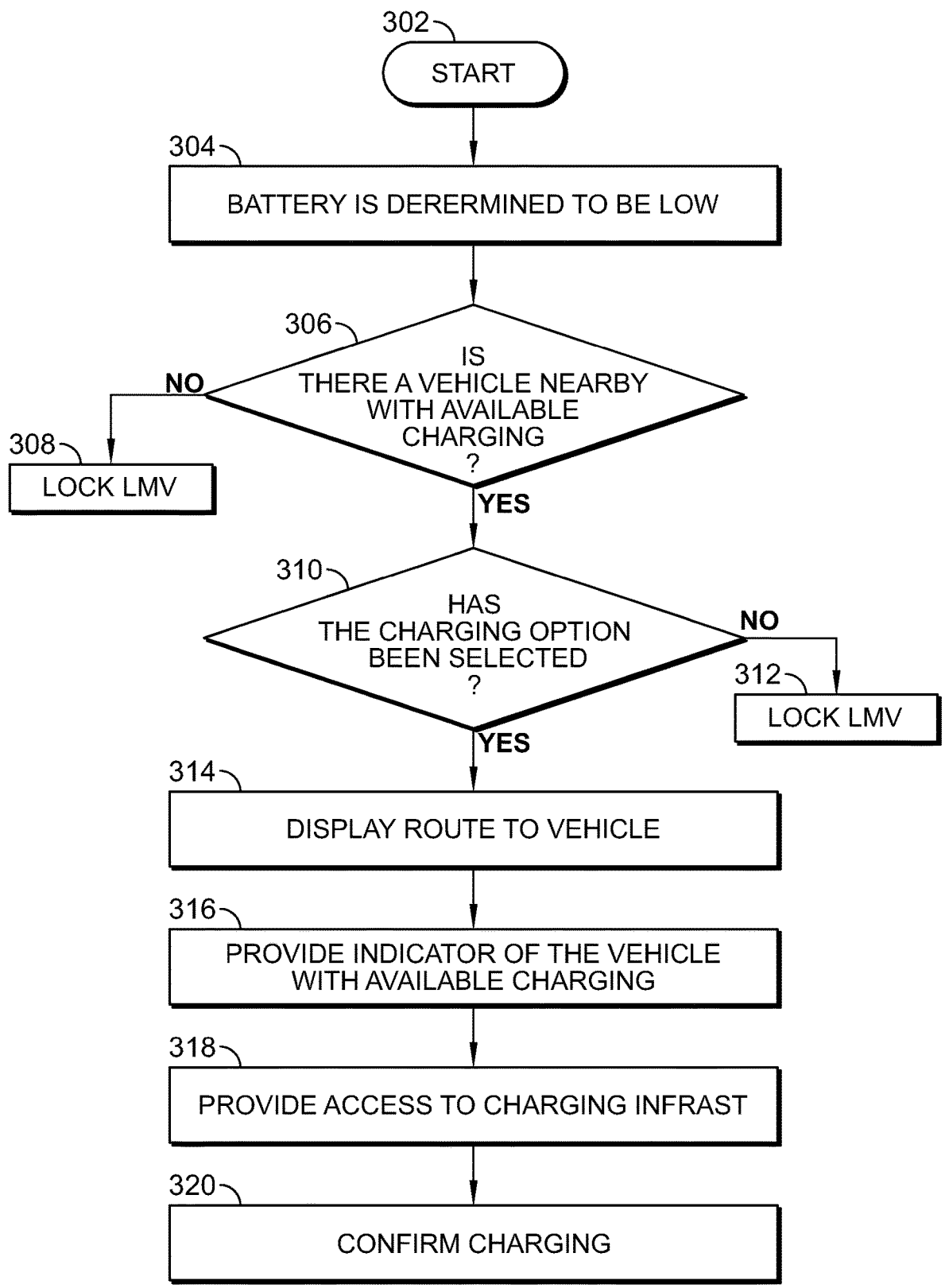
FIG. 3 is a diagrammatic flow chart of a method provided in accordance with the disclosed embodiments.
Figure 4:
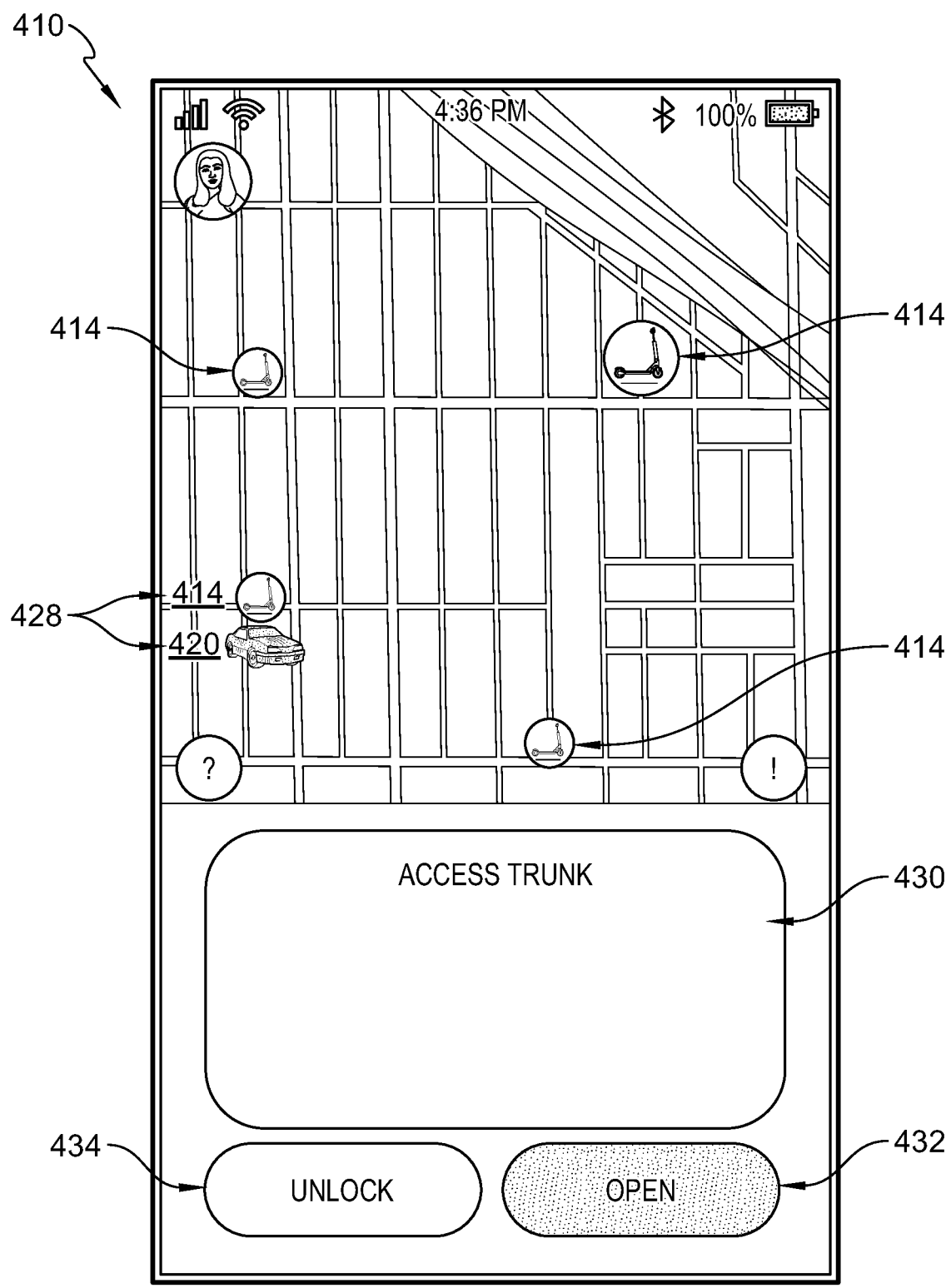
FIG. 4 is an exemplary embodiment of how an LMV may be retrieved from a vehicle.

As seen in FIG. 4, the application 410 depicts available LMVs for a new active ride session. The location of the user of the application may be indicated on the map relative to the available LMVs. In this example, the closest available LMV is indicated to be coupled to the charging infrastructure in a charging vehicle. In some embodiments, LMVs will only be shown as available when coupled to charging infrastructure if they are fully charged or over a predetermined percentage charged. In this embodiment, when the user and application 410 are within a predetermined distance of the charging vehicle, the user may receive a one-time access via a mobile device to unlock and open the tailgate as detailed above with respect to FIG. 3. The user may then disconnect the LMV from the charging infrastructure, remove the LMV and confirm closing the tailgate as discussed above. Likewise, the user may simply disconnect the LMV from charging infrastructure and confirm closing and locking of a panel for exterior charging infrastructure. Then the user may use the application to initiate an active ride session.

Figure 5:
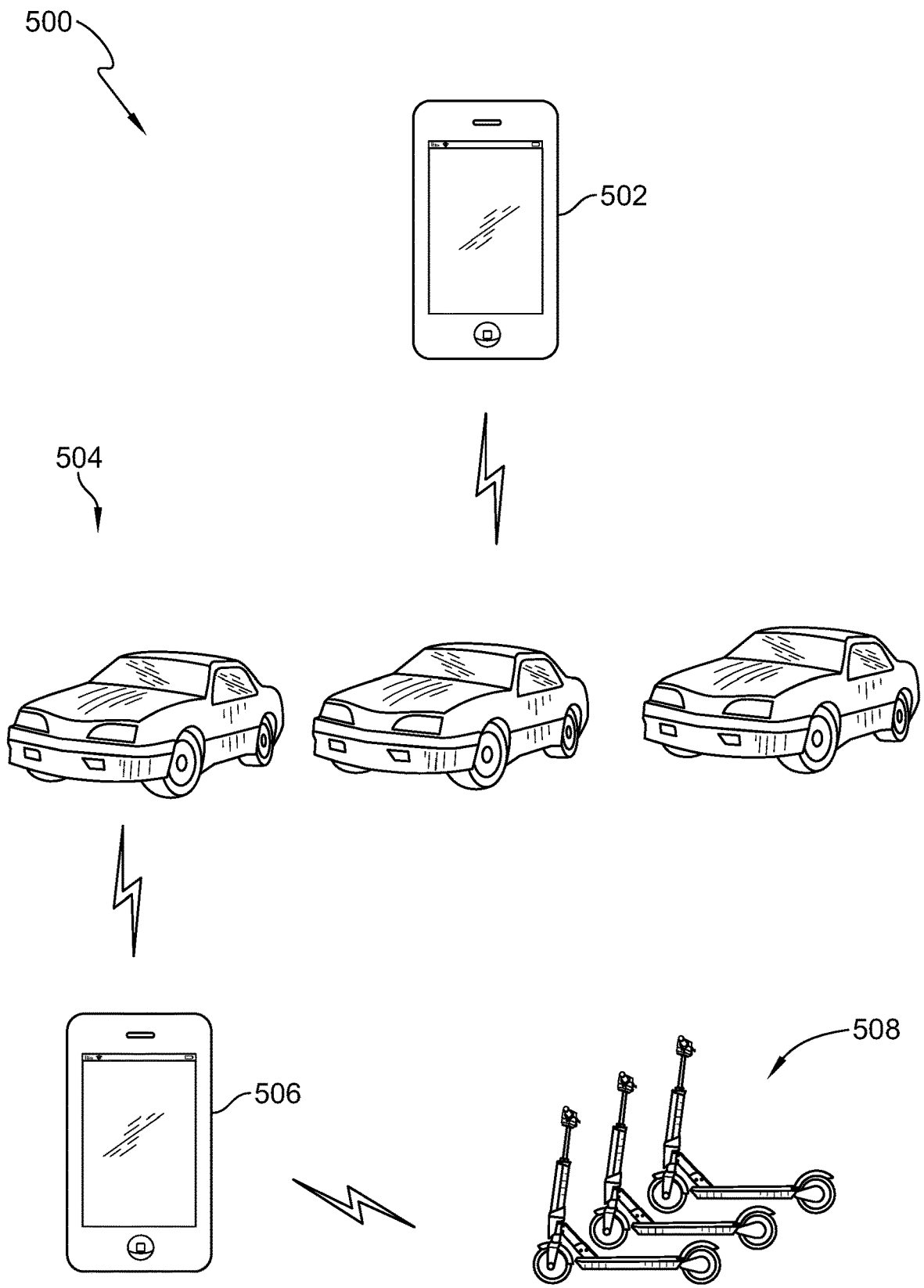
FIG. 5 is a schematic diagram of mobile devices in communication with a fleet of decentralized charging vehicles and a fleet of LMVs in accordance with the disclosed embodiments.

FIG. 5 illustrates an exemplary charging system in which a first mobile 506 device includes an application configured to communicate with a fleet of shareable LMVs 508 and a fleet of shareable vehicles 504 as described above with respect to FIGS. 1-4. A second mobile device 502 may include a second application configured to communicate with the fleet of shareable vehicles 504 that may be configured as charging vehicles. The second mobile device 502 may receive information from the fleet of vehicles 504 or from particular vehicles within the fleet of vehicles 504 regarding whether an LMV 508 is charging in or adjacent to the vehicle. For example, when a user of the second mobile device 502 accesses the second application and wishes to initiate an active riding session in a vehicle, a map of vehicle icons may appear with indicators as to which vehicles have LMVs in the trunk or which vehicles have LMVs attached on the outside. In some embodiments, when the LMV is in the trunk, the second mobile device 502 may indicate an incentive, such as a better rate or ride credit, to encourage the user to use the particular charging vehicle so that the LMV may charge while the charging vehicle is operated. In some embodiment's first and second mobile devices 502, 506 may have one of or both of the first and second applications.

Figure 6:
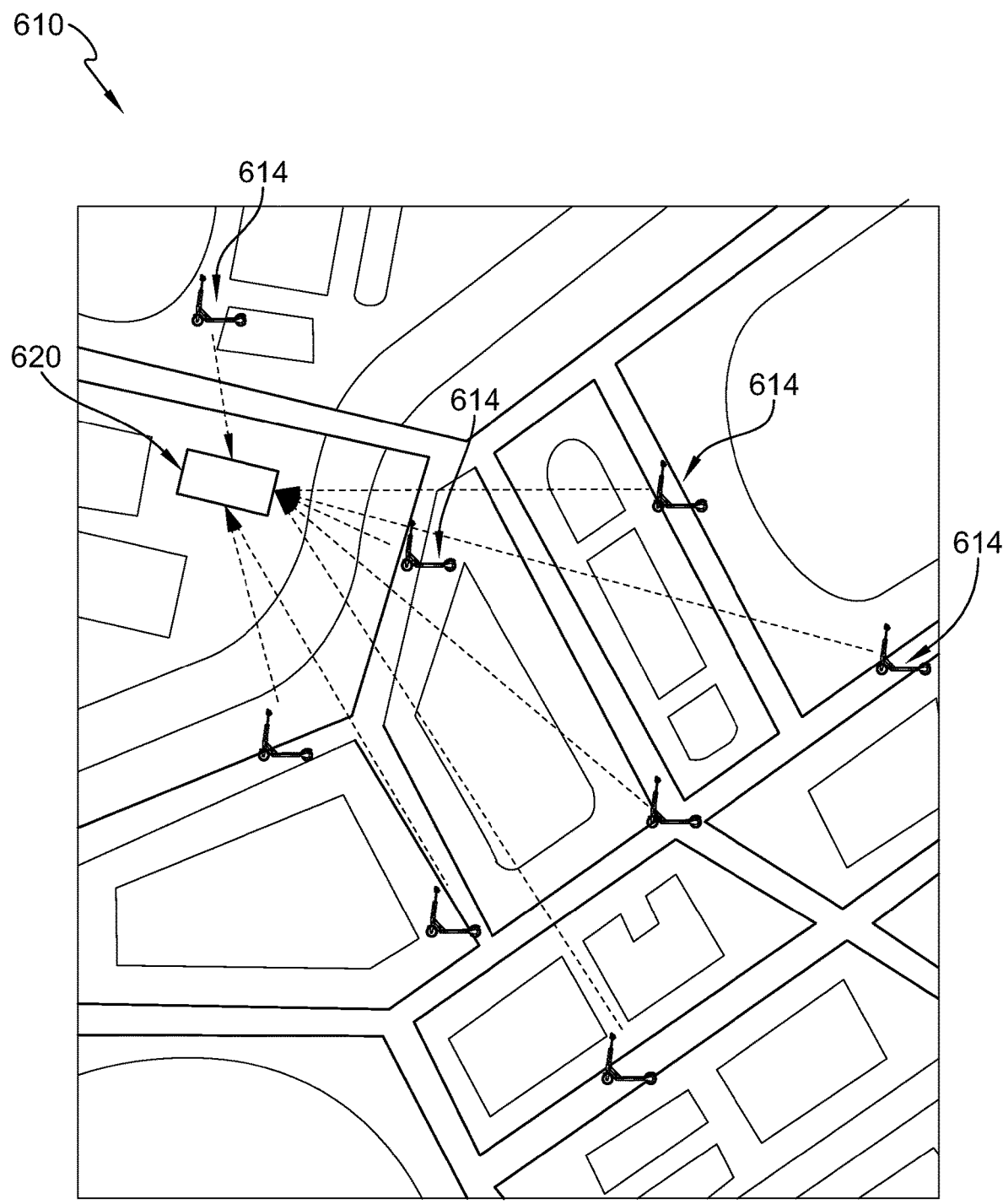
FIG. 6 is an exemplary embodiment of how a charging vehicle may identify one or more LMVs in need of charging.

FIG. 6 is an illustrative embodiment of the application of FIGS. 1-4, in which the application 610 is in a charging seeking mode. In this mode, for example, a user of a fleet vehicle 620 may be terminating a ride. The low battery LMVs 614 within a particular proximity may be displayed on a map and the user may adjust his final parking spot in order to be adjacent to an LMV to charge. Additionally, using the existing model of having a dedicated or assigned "Charger" who collects and charges multiple LMVs, the application may calculate the shortest distance between several LMVs that have a low battery and parked charging vehicles. The Charger would then get an optimized route to drive from LMV to LMV to drop each LMV inside a different charging vehicle for charging.

To date LMVs have had to be collected by individuals at the end of the day. Therefore, LMVs may be out of circulation a substantial portion of the day if they are used heavily early in the day and the battery runs out earlier than collection time at the end of the day. The charging takes place over night and LMVs are distributed on the next morning. This takes a lot of time and is not cost effective. By using a decentralized fleet of shared vehicles as described above, the systems and methods provide the technical utility of controlled access to decentralized charging infrastructure. In other words, LMVs can be charged as they run out of power and continuously be reintroduced into use throughout the day and night. The decentralized system may further reduce transportation efforts for charging, as individuals are not required to be dispatched as chargers. Furthermore, by providing charging inside the vehicle, there may be a reduction of clutter on streets and sidewalks of LMVs not in use. Additionally, there may be an additional revenue stream to fleets of shared vehicles or individual vehicles that are being used as charging vehicles.

Although certain embodiments have been described and illustrated in exemplary forms with a certain degree of particularity, it is noted that the description and illustrations have been made by way of example only. Numerous changes in the details of construction, combination, and arrangement of parts and operations may be made.

The invention claimed is:

1. A method for charging a localized use vehicle, wherein the method is performed by an application on a mobile device, the method comprising:
activating a localized use vehicle session,
evaluating the charge state of a localized use vehicle,
tracking a geographical location of the localized use vehicle,
receiving a selection of a user of the localized use vehicle to terminate the active session,
determining a decentralized charging vehicle being parked within a predefined distance of the localized use vehicle at the time of termination of the active session and having charging availability,
displaying the location of the parked decentralized charging vehicle that has charging availability, and providing access to a charging interface of the decentralized charging vehicle to couple the localized use vehicle to the charging interface by unlocking a trunk or a charging cap of the decentralized charging vehicle.

2. The method of claim 1, wherein the decentralized charging vehicle is comprised in-a fleet of shared vehicles.

3. The method of claim 2, wherein the decentralized charging vehicle is a privately owned vehicle.

4. The method of claim 2, further comprising activating a vehicle session, and notifying a user whether a vehicle available for a vehicle session is charging a localized use vehicle at a time prior to activation of the vehicle session.

5. The method of claim 1, wherein the decentralized charging vehicle that has charging availability provides a visual or audible indicator in response to the mobile device being in proximity to the vehicle.

6. The method of claim 1, wherein the localized use vehicle comprises one of a scooter or a bicycle.

7. The method of claim 1, wherein the decentralized charging vehicle comprises a charging interface accessible in the trunk of the vehicle and comprises a power cord coupled to a power supply of the vehicle, and the localized use vehicle is positioned in the vehicle trunk in a charge position.

8. The method of claim 1, wherein the one or more decentralized charging vehicles comprises a charging interface accessible on the exterior of the vehicle and comprises a power cord coupled to a high voltage battery of the vehicle, and the localized use vehicle is positioned exterior to the vehicle in a charge position.

9. A mobile device with an application for decentralized charging of localized use vehicle comprising:
the application configured to:
activate a localized use vehicle session,
evaluate the charge state of a localized use vehicle,
receive a selection of a user of the localized use vehicle to terminate the active session,
track a geographical location of the localized use vehicle,
determine a decentralized charging vehicle being parked within a predefined distance of the localized use vehicle at the time of termination of the active session and having charging availability,
display the location of the parked decentralized charging vehicle that has charging availability, and
provide access to a charging interface of the decentralized charging vehicle to couple the localized use vehicle to the charging interfaceby unlocking the trunk or a charging cap of the decentralized charging vehicle.

10. The mobile device of claim 9, wherein the application provides a one-time access prompt to unlock the trunk or the charging cap.

11. The mobile device of claim 9, wherein the decentralized charging vehicle that has charging availability is displayed in response to all of: the charge state of the localized use vehicle being below a certain threshold, a user terminating the active session, and the decentralized charging vehicle being within a predefined distance of the localized use vehicle at the time of termination of the active session.

12. The mobile device of claim 9, wherein the application further displays a map of localized use vehicles available to activate a new active session.

13. The mobile device of claim 12, where the display includes localized use vehicles coupled to charging interfaces of decentralized charging vehicles.

14. The mobile device of claim 13, wherein the application permits selection of a localized use vehicle coupled to a charging interface of the plurality of localized use vehicles coupled to the plurality of charging interfaces.

15. The mobile The device of claim 14, wherein, in response to the mobile device being in proximity to the selected localized use vehicle, the application provides a one-time access prompt to unlock the trunk of the vehicle to access the localized use vehicle.

16. The mobile The device of claim 9, wherein the localized use vehicle comprises one of a scooter, a bicycle, a battery, or a fleet vehicle, and wherein the one or more decentralized charging vehicles comprises a fleet of shared vehicles.

\* \* \* \* \*